United States Patent [19]

Gibbard

[11] Patent Number: 4,582,582

[45] Date of Patent: Apr. 15, 1986

[54] METHOD AND MEANS FOR GENERATING ELECTRICAL AND MAGNETIC FIELDS IN SALT WATER ENVIRONMENT

[75] Inventor: Henry F. Gibbard, Schaumburg, Ill.

[73] Assignee: Gould Inc., Rolling Meadows, Ill.

[21] Appl. No.: 660,242

[22] Filed: Oct. 11, 1984

Related U.S. Application Data

[63] Continuation of Ser. No. 487,791, Apr. 22, 1983, abandoned, which is a continuation-in-part of Ser. No. 372,785, Apr. 28, 1982.

[51] Int. Cl.$^4$ .............................................. C25B 11/10
[52] U.S. Cl. .................... 204/193; 204/1 R; 204/155; 204/164; 204/194; 204/280; 204/286; 204/290 F; 204/297 R; 114/221 R; 114/270; 114/343
[58] Field of Search ............... 204/147, 196, 290 F, 204/286, 297 R

[56] References Cited

U.S. PATENT DOCUMENTS

| | | | |
|---|---|---|---|
| 2,863,819 | 12/1958 | Preiser | 204/196 |
| 2,996,445 | 8/1961 | Eisenberg et al. | 204/196 |
| 3,010,891 | 11/1961 | Anderson | 204/290 F |
| 3,038,849 | 6/1962 | Preiser | 204/196 |
| 3,104,220 | 9/1963 | Preiser | 204/196 |
| 3,313,721 | 4/1967 | Teel | 204/290 F |
| 3,516,917 | 6/1970 | Maurin | 204/196 |
| 3,616,418 | 10/1971 | Anderson | 204/290 F |
| 3,718,554 | 2/1973 | Jacobs et al. | 204/147 |
| 3,761,385 | 9/1973 | Ruthel et al. | 204/290 F |
| 3,776,834 | 12/1973 | O'Leary | 204/290 F |
| 4,160,229 | 7/1979 | McGough | 340/7 R |
| 4,292,149 | 9/1981 | Warne | 204/147 |

Primary Examiner—T. Tung
Attorney, Agent, or Firm—Jeannette M. Walder; G. Paul Edgell; E. E. Sachs

[57] ABSTRACT

An elongated dimensionally stable flexible electrode (30) having a current carrying inner portion (31) in an outer protective and electrically conductive sheath (33) preferably formed of ruthenium dioxide. A layer of titanium cladding (33) may be provided on the inner current carrying portion (31) for carrying the outer sheath (33). The anode electrode is utilized for generating electrical current, such as for use in developing magnetic fields in salt water environments, preferably as an element of a sweep cable device having a floatation means around which one or more electrodes are helically wound.

35 Claims, 6 Drawing Figures

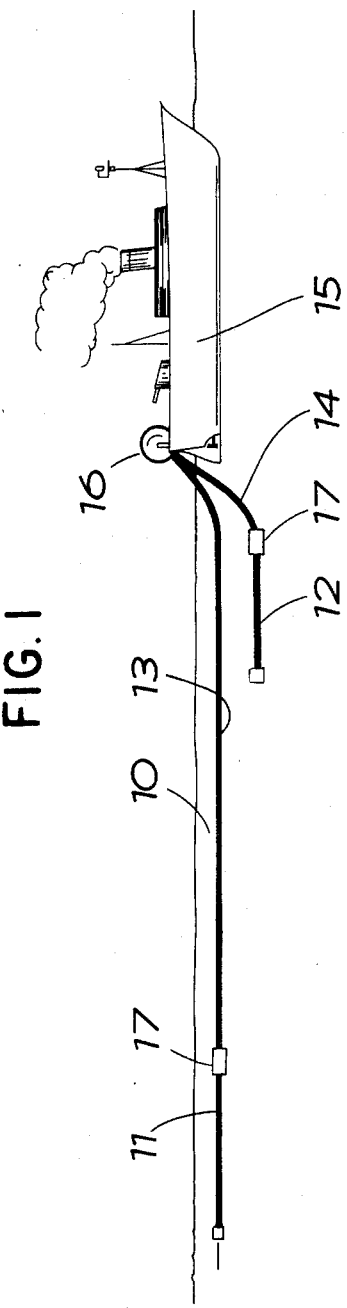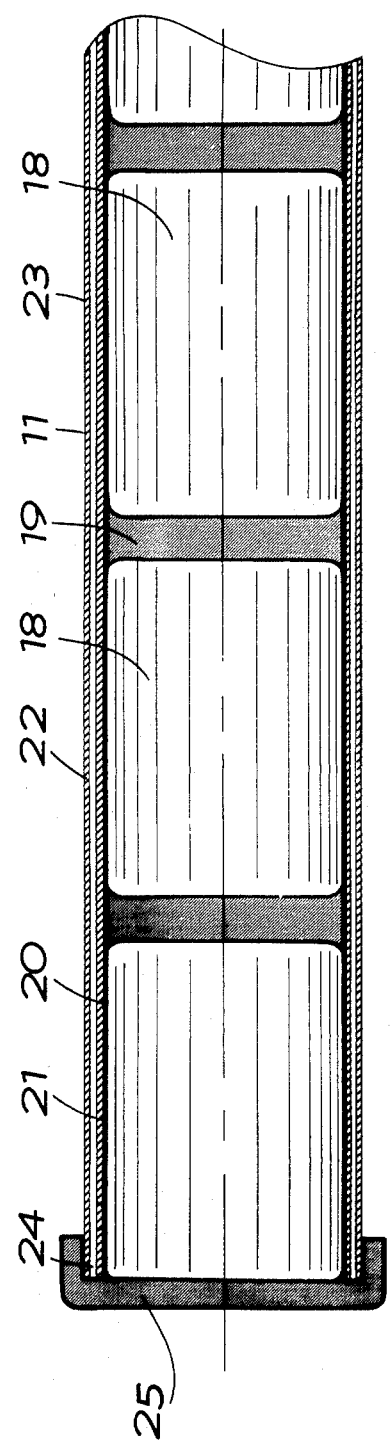

METHOD AND MEANS FOR GENERATING ELECTRICAL AND MAGNETIC FIELDS IN SALT WATER ENVIRONMENT

RELATED APPLICATIONS

This application is a continuation of application Ser. No. 487,791 filed Apr. 22, 1983, now abandoned, which is a continuation in part of application Ser. No. 372,785 filed Apr. 28, 1982 the specification and claims of which are specifically incorporated herein by reference.

DESCRIPTION

1. Technical Field

This invention relates to the generation of electrical and magnetic fields in salt water environments by means of spaced charged electrodes.

2. Background Art

One known method of generating magnetic fields in salt water environments and the like, is to provide, on the end of flexible electrical conductors, electrodes formed of aluminum. Current flows from one electrode through the salt water to the other electrodes and in doing so, generates the desired magnetic field.

A problem arises in the use of such electrodes in that the anode tends to dissolve so that, in normal operation, the life of the anode is generally less than about 20 hours. As such structures illustratively represent very high replacement costs it is highly desirable to prevent such deterioration, to provide extended useful life, or preferably both.

3. Disclosure of Invention

The present invention comprehends the provision of a dimensionally stable anode electrode to generate electric or magnetic fields in a salt water environment. The novel electrode of the present invention has a useful life of up to approximately 100 times that of the conventional aluminum electrode.

In addition, the present invention comprehends a novel anode sweep cable device comprising at least one dimensionally stable electrode helically wound around an elongated floatation means, each such electrode having a conductive core, a protective layer of titanium, and a current carrying outer layer containing ruthenium dioxide in an effective amount for preventing rapid deterioration of the electrode when used as an anode in salt water environments.

In the illustrated embodiments, the anode electrode is constructed to be relatively light-weight.

In the illustrated embodiments, the anode electrode is constructed to be flexible, permitting the electrode to be helically wound around the floating means.

In the illustrated embodiments, the anode electrode and the floatation means are constructed to be flexible, permitting the anode cable device to be wound onto a reel for storage purposes and the like.

In the illustrated embodiments, the anode cable device includes a floatation means comprising a plurality of hollow floatation elements.

The anode electrode includes an inner current carrying core of copper provided with a protective layer of titanium and an outer layer of ruthenium dioxide. Alternatively, the core may be formed of titanium where high electrical resistance is not a problem.

In the illustrated embodiments, the outer ruthenium dioxide layer is provided directly on the titanium layer.

The anode electrode may define a terminal portion of a cable adapted to be stored on a reel and paid out from a maring carrier, such as a marine craft, sled, etc., to function as a sweep cable.

In the illustrated embodiments, the distal end of the anode electrode is provided with an electrically insulating cap.

Thus, the invention comprehends a novel dimensionally stable anode electrode for use in salt water environments, permitting substantial current flow therefrom, such as for use in generating electrical and magnetic fields, in marine environments. The anode electrode utilizes an outer covering containing ruthenium dioxide on the anode electrode.

The method and means of the present invention are extremely simple and economical while yet providing an improved long life of the electrode.

BRIEF DESCRIPTION OF THE DRAWING

Other features and advantages of the invention will be apparent from the following description taken in connection with the accompanying drawing wherein:

FIG. 1 is a schematic illustration of a marine application of a sweep cable having an anode electrode embodying the invention; and FIG. 2 is a fragmentary enlarged diametric section of an end portion of one embodiment of an anode electrode.

BEST MODE FOR CARRYING OUT THE INVENTION

Figure 3:
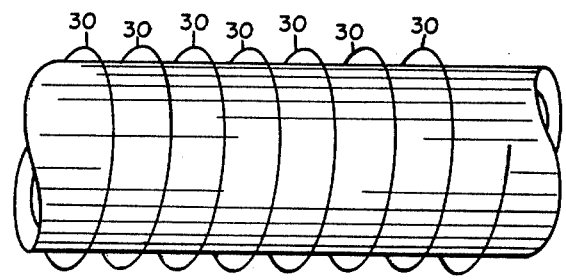
FIG. 3 is a fragmentary enlarged diagramatic section of one embodiment of an anode cable device having a single anode electrode means helically wound around a floatation means.

In the illustrative embodiment of the invention as disclosed in FIGS. 1 and 2, a high amperage electrical current is generated in a body of salt water 10 between an anode electrode 11 and a cathode electrode 12. In the illustrated embodiment, the electrodes define end portions of cable 13 and 14, respectively, extended rearwardly from a marine craft 15 so as to define sweep cables.

Illustratively, the high current flowing between the anode and cathode disposed in the water may generate an electrical field such as found to be efficacious in bringing shrimp into sweeping engagement for improved harvesting.

The structure alternatively may be used to generate a magnetic field, such as utilized for detonating underwater mines and the like.

As further illustrated in FIG. 1, the cables may be wound on a suitable reel 16 for storage purposes and are paid out therefrom to be disposed in the operative field-forming arrangement as the marine craft is moved forwardly through the water. Illustratively, the cables heretofore employed conventionally comprised insulated aluminum cables having a 4" diameter capable of carrying currents of up to 10,000 amperes. The juncture 17 between the cable 13 and the anode electrode 11 defines a sealing coupling. Illustratively, as seen in FIG. 1, the length of the cable 13 may be approximately 300 feet, with the length of the anode electrode being approximately 140 feet. As indicated above, in the cables of the prior art, such anode electrodes have been defined by the exposed aluminum core and have required frequent replacement because of deterioration thereof in use.

The improved anode electrode 11 of the present invention is illustrated in greater detail in FIG. 2. As shown therein, the core of the electrode is defined by a plurality of substantially rigid bottles 18 formed of suitable synthetic resin, such as lucite or polycarbonate plastic, defining floatation chambers within the electrode. The space between respective floatation elements 18 may be filled with flexible polyurethane 19, or the like. The core may be provided with a surrounding layer 20 of water sealing material, such as rubber.

A tubular current carrying layer 21 is provided coaxially of the water sealant layer 20, and in the illustrated embodiment, is formed of copper having a sufficient thickness to permit the high desired current flow without adverse heat effects. As will be obvious to those skilled in the art, other suitable high current carrying materials may be utilized within the scope of the invention, one such alternative material comprising graphite fibers doped with arsenic pentafloride for providing high tensile strength as well as high current carrying capacity.

Surrounding the current carrying layer or core 21 is a protective cladding 22 formed of titanium and serving as a base for an outer protective sheath 23 of ruthenium dioxide. Alternatively, the core may be formed of titanium where the high electrical resistance thereof is permissible.

The distal end 24 of the anode electrode is preferably provided with an insulating cap 25 formed of a suitable synthetic resin.

The ruthenium of the protective sheath causes catalysis of the oxidation of chloride ion to chlorine without deterioration of the sheath. Resultingly, while the anode is capable of carrying currents of up to as much as 10,000 amperes or more, it has been found to be extremely dimensionally stable even under low amperage conditions so as to have a useful life limited to the mechanical life of the structure under rough mechanical treatment as occurs in such marine use, thereby effectively reducing the cost of the electrical and magnetic field generating operation.

Figure 4:
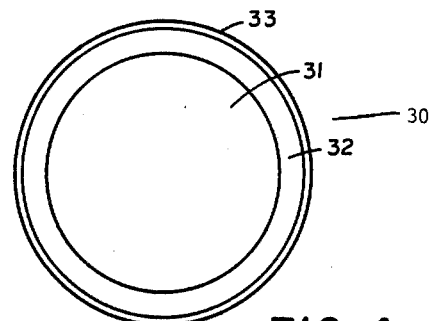
FIG. 4 is an enlarged cross section of an anode electrode contemplated by the present invention.

FIG. 3 illustrates one of the prefered embodiments of the present invention where an anode electrode 30 is helically wound around floatation means 29. FIG. 4 illustrates a cross section of electrode 30, with a conductive core 31 preferably of copper, a protective layer 32 of titanium, and an outer protective sheath 33 preferably of ruthenium dioxide, but protective sheath 33 may also be of iridium oxide or a mixture of ruthenium dioxide and tin oxide containing up to 20 mole percent tin. It will be understood that where a plurality of electrodes is employed, each separate electrode carries only its proportional share of the overall current to be generated.

In general, the diameter of core member 31 should be at least 60 percent of the diameter of the entire electrode, and protective layer 32 should be substantially thicker than outer protective sheath 33.

In general, the electrode illustrated in cross section view of FIG. 4 may have any suitable thickness, however, the following general limits are preferred:

Core 31 should be from about 0.05 to about 0.5 inch and preferably from about 0.1 to about 0.25 inch, protective layer 32 should be from about 0.005 to about 0.020 inch and preferably from about 0.010 to about 0.015 inch, protective sheath 33 should be less than about 0.3 mil and preferably less than about 0.08 mil.

As one example of a suitable anode electrode, an electrode was constructed wherein the diameter of core member 31 was approximately 0.18 inch, the thickness of the protective layer 32 was 0.012 inch and the outer protective sheath 33 had a thickness of approximately 0.08 mil.

Floatation means 29 should be of a low density generally less than about 0.8 gms/cc and preferably less than about 0.5 gms/cc. The overall density of the anode sweep cable device should be less than about 1.0 and preferably less than about 0.95 gms/cc. The overall density of the anode sweep cable device is the critical density limitation.

Typically, the anode sweep cable device will have a length of about 20 feet to about 500 feet and preferably from about 100 feet to about 200 feet. The anode sweep cable device should be capable of transmitting a high current density typically in the range from about 20 mA/cm$^2$ to about 1 A/cm$^2$ and preferably in the range of 50 to about 150 mA/cm$^2$.

Figure 5:
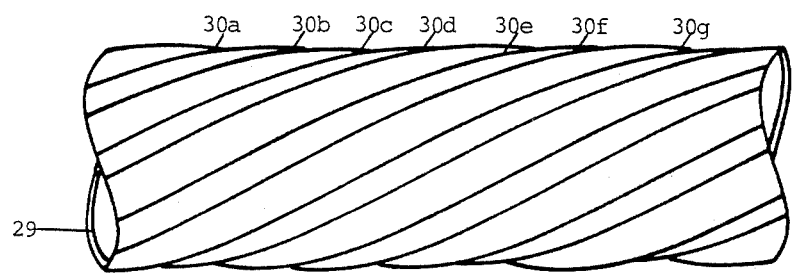
FIG. 5 is a fragmentary enlarged diagramatic section of an alternative embodiment of an anode cable device having a plurality of electrode means helically wound around a floatation means.

FIG. 5 illustrates an alternate embodiment of the present invention in which a plurality of anode electrodes 30a, 30b, 30c, 30d, 30e, 30f, 30g are wound about a single floatation means 29. Each of these anode electrodes would correspond to the foregoing description of single anode electrode 30. By employing a plurality of electrodes, it is possible to continue to generate an electrical or magnetic field even after one or more of the individual anode electrode members may have been damaged during winding or unwinding from reel 16 of FIG. 1 or during towing. In theory, any number of individual anode electrode members may be employed, depending upon the overall length of the anode sweep cable device, and the relative thickness of the anode electrode means. Preferably the anode sweep cable device should be contructed employing at least five individual anode electrode members and preferably from about ten to thirty individual anode electrode members.

Figure 6:
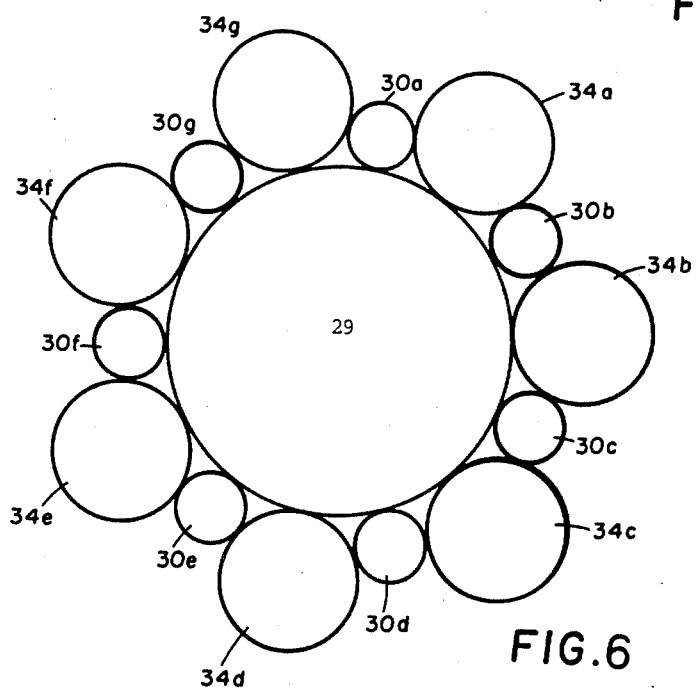
FIG. 6 is a cross section of a still further alternative embodiment of an anode cable device of the present invention.

FIG. 6 illustrates a still further embodiment of an anode sweep cable device of the present invention. FIG. 6 is a cross sectional view in which anode electrode members 30a through 30g are helically wound around floatation means 29 and separated from each other by plurality of insulating means 34a through 34g also helically wound around floatation means 29. In addition to insulating the individual anode electrode members from each other, the insulating members when constructed with low density materials can provide buoyancy and thereby desirably lower the overall density of the anode sweep cable device.

Alternatively or additionally, insulating means 34a through 34g can serve to protect the individual anode electrode members from damage during winding, unwinding or towing. This is particularly true of the embodiment illustrated in FIG. 6 where the insulating means has a substantially larger cross sectional diameter than the anode electrode. It was earlier noted that it is the overall density of the anode sweep cable means and not the density of the floatation means which is critical. One reason that the density of floatation means 29 is not critical, is that the plurality of insulating means can provide substantial additional buoyancy.

INDUSTRIAL APPLICABILITY

The electrode of the present invention, as indicated above, is adapted for a wide range of uses in generating electrical currents and magnetic fields in salt water environments and the like. The invention comprehends providing, on the distal end of a flexible sweep cable, a flexible anode electrode having a ruthenium dioxide sheath. Current flows from the anode to a cathode electrode placed at a distance therefrom in the salt water environment.

MODIFICATIONS AND OPERATION

The invention comprehends selectively retaining the sweep cable device and electrodes on a marine craft with one or both of the electrodes and cable disposed in a rolled configuration.

Further, the invention comprehends selectively trailing the electrodes behind the marine craft in spaced relationship, with the cable and anode electrode being unrolled from the rolled configuration. A preselected voltage is applied between the trailing electrodes, causing a high current flow therebetween, with the improved construction of the electrodes effectively minimizing deterioration of the electrodes in such use.

It will be clear to those skilled in the arts that a wide variety of modification and changes can be made in the construction and operation of the novel methods and apparatus of the present invention without departing from the scope of the invention herein described. Thus, the sweep cable device may be merely the distal end of cable 13 in FIG. 1 or may extend all the way up to or even onto the marine vessel by which it is being towed.

In one application each of the electrodes can be provided with a ruthenium dioxide outer layer and the electrodes used alternatively as anodes and cathodes by suitable selective switching.

The foregoing disclosure of specific embodiments is illustrative of the broad inventive concepts comprehended by the invention.

I claim:

1. Apparatus for generating electrical and magnetic fields in salt water environments comprising:
   a first electrode adapted to be trailed in a salt water marine environment;
   a bouyant, flexible, electrically conductive sweep cable adapted to be trailed in said salt water marine environment;
   at least one dimensionally stable second electrode helically wound on an elongated, flexible floatation means provided on the distal end of said sweep cable, said floatation means being bouyant when wound with said second electrode, said second electrode having a conductive core, a protective layer of titanium, and current carrying outer layer consisting essentially of a conductive material selected from the group consisting of ruthenium dioxide, iridium oxide, and mixtures of ruthenium dioxide and tin oxide in an effective amount for preventing rapid deterioration of said second electrode when employed in salt water marine environments, said first and second electrodes being in spaced relationship to one another when trailed in a salt water marine environment; and
   means for applying a preselected voltage between said first and second electrodes and having a sufficient capacity to cause a high current flow therebetween having a current density of at least about 50 mA/cm$^2$ at said electrode surfaces.

2. The apparatus of claim 1 wherein said second electrode is operated as an anode.

3. The apparatus of claim 1 wherein said second electrode is operated as a cathode.

4. The apparatus of claim 1 wherein said conductive material comprises a mixture of ruthenium dioxide and tin oxide.

5. The apparatus of claim 4 wherein said mixture comprises up to 20 mole percent tin.

6. The apparatus of claim 1 wherein said sweep cable is disposed in a roll configuration on a marine craft.

7. The apparatus of claim 6 wherein said sweep cable is unrolled from said roll configuration when said electrodes are trailed behind said marine craft.

8. The apparatus of claim 1 wherein said sweep cable has at least 10 electrodes helically wound about said floatation means.

9. The apparatus of claim 1 wherein said floatation means wound with said electrode has a length of at least 20 feet.

10. The apparatus of claim 9 wherein said floatation means wound with said electrode has a length of about 100 feet to 200 feet.

11. The apparatus of claim 1 wherein said conductive core has a diameter in the range of about 0.05 inch to about 0.5 inch, said protective layer has a thickness of about 0.005 inch to about 0.020 inch, and said outer layer has a thickness of less than about 0.3 mil.

12. The apparatus of claim 11 wherein said core diameter is about 0.1 to about 0.25 inch, the thickness of said protective layer is about 0.010 to about 0.015 inch, and the thickness of said outer layer is less than about 0.08 mil.

13. The apparatus of claim 1 wherein the density of said floatation means when wound with said anode electrode is less than about 0.95 g/cc.

14. The apparatus of claim 13 wherein the density of said floatation means is less than about 0.8 g/cc.

15. The apparatus of claim 13 wherein the density of said floatation means is less than about 0.5 g/cc.

16. The apparatus of claim 1 wherein said voltage applying means is of sufficient capacity to provide a current density in the range of about 50 mA/cm$^2$ to about 1 A/cm$^2$ at said electrode surfaces.

17. The apparatus of claim 16 wherein said current density is in the range of about 50 to 150 mA/cm$^2$.

18. The apparatus of claim 1 wherein said conductive core is selected from the group consisting of copper and titanium.

19. Apparatus for generating electrical and magnetic fields in salt water marine environments comprising:
   first and second bouyant, flexible, electrically conductive sweep cables adapted to be trailed in a salt water marine environment;
   at least one dimensionally stable first electrode helically wound on a first elongated, flexible floatation means provided on the distal end of said first sweep cable, said first floatation means being bouyant when wound with said first electrode, said first electrode having a conductive core, a protective layer of titanium, and a current carrying outer layer comprising a conductive material selected from the group consisting of ruthenium dioxide, iridium oxide and mixtures of ruthenium dioxide and tin oxide in an effective amount for preventing rapid deterioration of said first electrode when employed in a salt water marine environment;

at least one dimensionally stable second electrode helically wound on a second elongated flexible floatation means provided on the distal end of said second sweep cable, said second floatation means being bouyant when wound with said second electrode, said second electrode having a conductive core, a protective layer of titanium, and a current carrying outer layer comprising a conductive material selected from the group consisting of ruthenium dioxide, iridium oxide and mixtures of ruthenium dioxide and tin oxide in an effective amount for preventing rapid deterioration of said second electrode when employed in a salt water marine environment, said first and second electrodes being in space relationship to one another when trailed in a salt water marine environment; and means for applying a preselected voltage between said first and second electrodes to cause a high current flow therebetween.

20. The apparatus of claim 19 further including means for selectively switching the applied voltage between said electrodes such that each of said first and second electrodes is used alternatively as an anode and cathode.

21. The apparatus of claim 19 wherein said conductive material comprises a mixture of ruthenium dioxide and tin oxide.

22. The apparatus of claim 21 wherein said mixture comprises up to 20 mole percent tin.

23. The apparatus of claim 19 wherein said sweep cables are disposed in a roll configuration on a marine craft.

24. The apparatus of claim 23 wherein said sweep cables are unrolled from said roll configuration when said electrodes are trailed behind said marine craft.

25. The apparatus of claim 19 wherein each said sweep cable has at least 10 electrodes helically wound about its respective floatation means.

26. The apparatus of claim 19 wherein said floatation means wound with said electrodes have lengths of at least 20 feet.

27. The apparatus of claim 26 wherein said floatation means wound with said electrodes have lengths of about 100 feet to 200 feet.

28. The apparatus of claim 19 wherein each said conductive core has a diameter in the range of about 0.05 inch to about 0.5 inch, each said protective layer has a thickness of about 0.005 inch to about 0.020 inch, and each said outer layer has a thickness of less than about 0.3 mil.

29. The apparatus of claim 28 wherein each said core diameter is about 0.1 to about 0.25 inch, the thickness of each said protective layer is about 0.010 to about 0.015 inch, and the thickness of each said outer layer is less than about 0.08 mil.

30. The apparatus of claim 19 wherein the density of each said floatation means when wound with its respective electrode is less than about 0.95 g/cc.

31. The apparatus of claim 30 wherein the density of each said floatation means is less than about 0.8 g/cc.

32. The apparatus of claim 31 wherein the density of each said floatation means is less than about 0.5 g/cc.

33. The apparatus of claim 19 wherein said voltage applying means is of sufficient capacity to transmit a current density in the range of about 20 mA/cm$^2$ to about 1 A/cm$^2$ at said first and second electrode surfaces.

34. The combination of claim 33 wherein said current density is in the range of about 50 to 150 mA/cm$^2$.

35. The apparatus of claim 19 wherein said conductive core is selected from the group consisting of copper and titanium.

* * * * *